Figure 1:
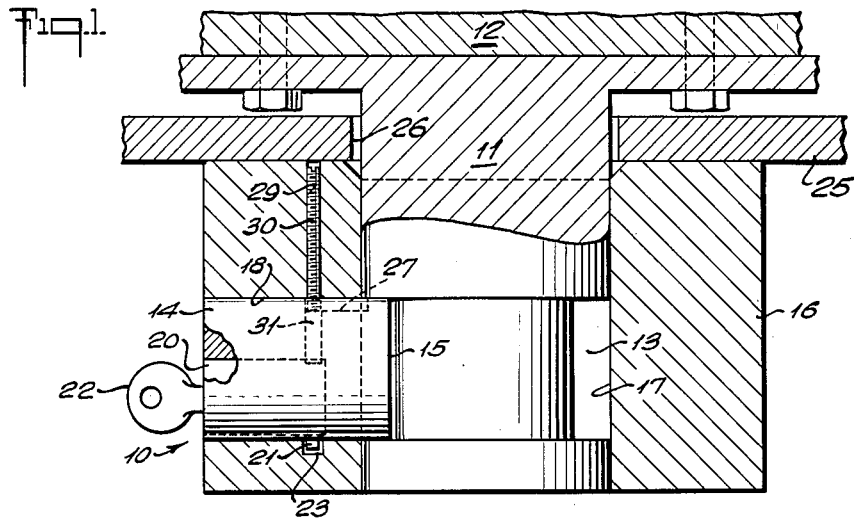

July 24, 1956  C. O. MAFFEY  2,755,655
LOCKING DEVICE FOR TRAILER KINGPINS
Filed Dec. 4, 1953

INVENTOR
C. O. MAFFEY
BY
ATTORNEY

United States Patent Office 2,755,655
Patented July 24, 1956

2,755,655

LOCKING DEVICE FOR TRAILER KINGPINS

Constant O. Maffey, Cranford, N. J.

Application December 4, 1953, Serial No. 396,278

2 Claims. (Cl. 70—232)

This invention relates to trailers and is particularly directed to the provisions of a locking device for trailer kingpins. In the conventional trailer construction, the trailer chassis is provided with a kingpin depending vertically therefrom, said kingpin having a recess disposed circumferentially therein. The trailer is conventionally provided with a skid plate having an opening through which the trailer kingpin depends, and the trailer is coupled to the tractor by backing the latter up to the kingpin which is engaged by a complementary unit on the tractor. The trailer-tractor combination is popularly used for the transportation of freight and for other purposes. When the destination is reached, the trailer is usually uncoupled from its tractor to await the unloading of the cargo. It is also frequently desirable to uncouple the tractor from the trailer for the convenience of the driver before and during loading as well as after unloading and prior to reaching the ultimate destination of the cargo.

It is frequently necessary to leave the trailer unattended on occasions such as those mentioned above, with the result that hijackers, on constant lookout for such situations, couple the trailers to other tractors and drive off with the cargo.

The annual loss sustained by shippers and insurance companies dut to such hijacking of trailers is a very substantial one. Quite apart from the monetary injury so suffered, the shipper whose trailer has been hijacked often finds it difficult to obtain new insurance, and without adequate insurance, soon finds himself practically out of businees, as few shippers would entrust their cargo to an uninsured trucking concern.

The present invention is designed not only to obviate the shipping hazzards above mentioned but also to reduce the insurance costs to truckers; this is attained by virtue of the provisions of the locking device described herein, which provides an effective safeguard against coupling the trailer kingpin to the tractor by an unauthorized person.

These and other advantageous objects, which will appear from the drawings and from the description hereinafter, are accomplished by the structure of my invention, of which an embodiment is illustrated in the drawings. It will be apparent, from a consideration of said drawings and the following description, that the invention may be embodied in other forms suggested thereby: such other forms as come within the scope of the appended claims are to be considered within the scope and purview of the instant invention.

Figure 2:
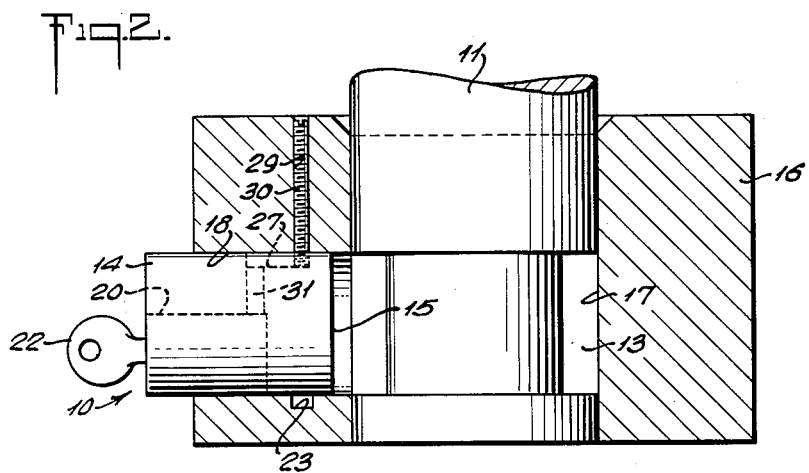
Figure 3:
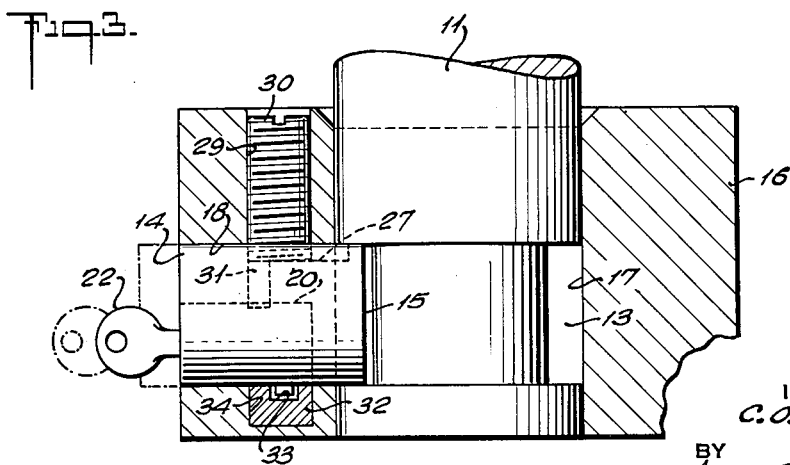

In the drawings:

Fig. 1 is a medial, vertical elevational view, taken through the locking device of the present invention, shown secured to a trailer kingpin in locking position thereon, the trailer kingpin being shown partly sectional and partly elevational, Fig. 2 is a similar view, showing the locking bar withdrawn from the kingpin recess to permit removal of the locking device of this invention from the kingpin, indicating likewise the initial position of the casing on the kingpin prior to being locked thereto, and Fig. 3 is a similar view showing a further form of the invention locked to a kingpin.

In the drawings the locking device of the invention is generally indicated by the reference character 10, for use in connection with the kingpin 11 depending from the trailer chassis 12, said kingpin having a recess 13 disposed circumferentially thereon which is engaged by the locking bar 14 of the present invention. The end 15 of bar 14 is projected into the recess 13 when the locking bar is in its locking position shown in Fig. 1, to thereby preclude unauthorized removal of the casing from the kingpin.

The locking device 10 comprises a casing 16 having an axial aperture 17 therethrough for reception of the kingpin, whereby the casing may be disposed thereon. The casing has a second aperture 18 disposed completely through the casing and opening into the first mentioned aperture 17. The parts are so proportioned that when the casing is positioned on the kingpin, the second aperture of the casing will be aligned with the kingpin recess 13. The locking bar 14 is slidably disposed in the aperture 18, so that, in one position thereof, above mentioned, the end 15 of the locking bar will be projected into the recess 13 of the kingpin to lock the casing to the kingpin. In the other position of the locking bar, shown in Fig. 2, the end 15 of the locking bar is withdrawn clear to the first mentioned aperture 17 of the casing, so that the casing 16 may be removed from the kingpin.

In order to lock the bar 14 in the position shown in Fig. 1, a key-actuated lock unit 20, which may be of conventional form, is disposed in the locking bar and is provided with a bolt 21 which is projected from the lock unit 20 on actuation of the latter by the key 22 and into a recess 23 in the casing opening into the second aperture 18 of the casing. The operation of lock unit 20 may be the reverse of that described, viz, the bolt 21 may be designed to automatically project itself into the recess 23 on insertion of unit 20 into aperture 18, and a key might then be required to withdraw the bolt 21 from recess 23. Thus, the casing 16 is locked to the kingpin 11 and may be withdrawn only on insertion of the key 22. It will be noted, from an examination of the drawings, that the parts are preferably so proportioned that the casing 16 is of a length equal to that of the depending portion of the trailer kingpin, so that the locking device, when it is locked to the kingpin, fits against the trailer or against the skid plate 25 of the trailer having an opening 26 through which the kingpin depends. Thus, the locking device forms essentially a snug unit with the kingpin and closes against the skid plate, shielding the opening 26 of the latter and preventing access to the kingpin or its recess. The second aperture 18 of the casing is preferably disposed at right angles to the first mentioned aperture thereof.

The locking bar may be so secured to the casing that it will have the limited movement therein which is required to permit sliding of the locking bar to move its end 15 out of the axial aperture 17 of the casing. For that purpose, a recess 27 provided in the locking bar of lesser length than the second aperture 18 of the casing and the casing provided with a third aperture 29 disposed at right angles to the second aperture 18 and adapted to receive a holding element 30 to be positioned therein with the end thereof projecting into the second aperture, as shown in Fig. 1, to thereby project the holding element 30 into the recess 27 and key the locking bar of the second aperture 18 against complete withdrawal therefrom, while enabling the locking bar 14 to be slidably moved to the limited extent noted in Figs. 1 and 2 of the drawings. The lock unit 20 may be secured to the locking bar 14 by means such as the holding screw 31 provided in the locking bar 14 and engaging the lock unit 20. The recess 23 and the third aperture 29 of the casing 16 may be formed in line, as, for example, by drilling the same therein, prior to the insertion of the locking bar into its aperture 18.

As shown in Fig. 3, the recess 23 may be backed up by a hardened tamper-proof insert 32 which in turn is provided with a recess 33 to receive the locking bolt 21. In that form of invention, if the third aperture 29 is formed at the time of forming the recess 34 in the casing 16 to receive the tamper-proof insert 32, the member 30 might be made of correspondingly greater diameter as indicated in Fig. 3.

Having thus described my invention, what I claim as new and desire to secure by Letters Patent is:

1. A locking device for use in connection with a trailer kingpin extending downwardly through a skid plate and having a circumferential recess therein; comprising a unitary cylindrical casing having an axial aperture therein for receiving the kingpin and having a substantially thick wall surrounding the said aperture, said casing being of a length such that in its operative kingpin engaged position, one end thereof extending substantially to said skid plate and the opposite end thereof is flush with the free end of the kingpin, said casing being provided with a second aperture of constant diameter throughout its length extending completely through the wall thereof and opening into said first aperture, said second aperture being of a diameter substantially equal to the width of said recess in the kingpin, a locking bar slidably disposed in said second aperture and cross-sectionally conforming therewith and of constant diameter throughout its length, the locking bar being of a length greater than the thickness of said wall whereby upon predetermined inward sliding movement thereof, its inner end enters said recess in the kingpin and its outer end is flush with the outer surface of said wall, and concealed cooperating key operated locking means in the locking bar and the wall of said second aperture whereby in the operative locked position of the device, the casing presents a smooth imperforate cylindrical outer wall except for a keyhole and the inner ends of said casing and kingpin present a smooth imperforate plane wall for precluding unauthorized removal thereof.

2. The structure according to claim 1, wherein said casing is provided with a third aperture parallel with the axis of said first aperture and normal to the axis of said second aperture, said locking bar being provided with a recess elongated in the direction of the axis thereof, an elongated retaining element disposed within said third aperture having one end thereof disposed within said recess and alternately engagable with opposite end walls thereof for limiting movement of the locking bar to its operative and inoperative positions, the upper end of said third aperture being closed by said skid plate in the operative position of the device for preventing unauthorized access to said retaining element.

References Cited in the file of this patent

UNITED STATES PATENTS

| | | |
|---|---|---|
| 1,442,315 | Weller et al. | Jan. 16, 1923 |
| 1,934,327 | Ridder | Nov. 7, 1933 |
| 2,218,126 | Thacher | Oct. 15, 1940 |
| 2,630,698 | Morrow | Mar. 10, 1953 |
| 2,641,124 | Gallagher et al. | June 9, 1953 |